Dec. 11, 1934.   C. A. GRASSWICK   1,984,184
COMBINE HARVESTER
Original Filed March 16, 1931   2 Sheets-Sheet 1
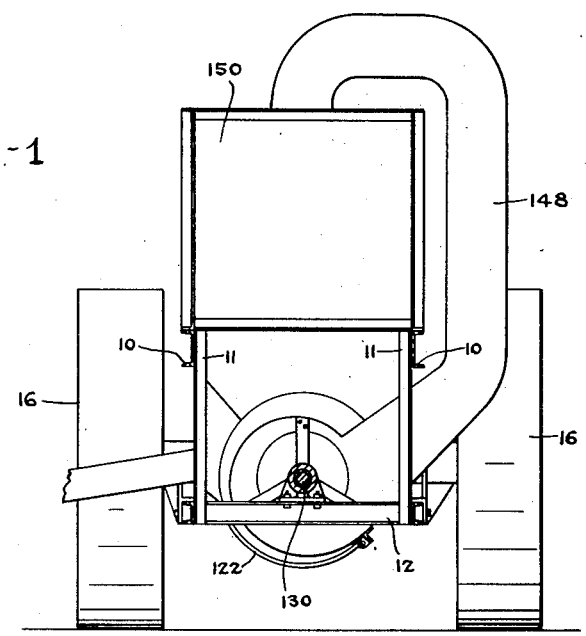
Fig-1
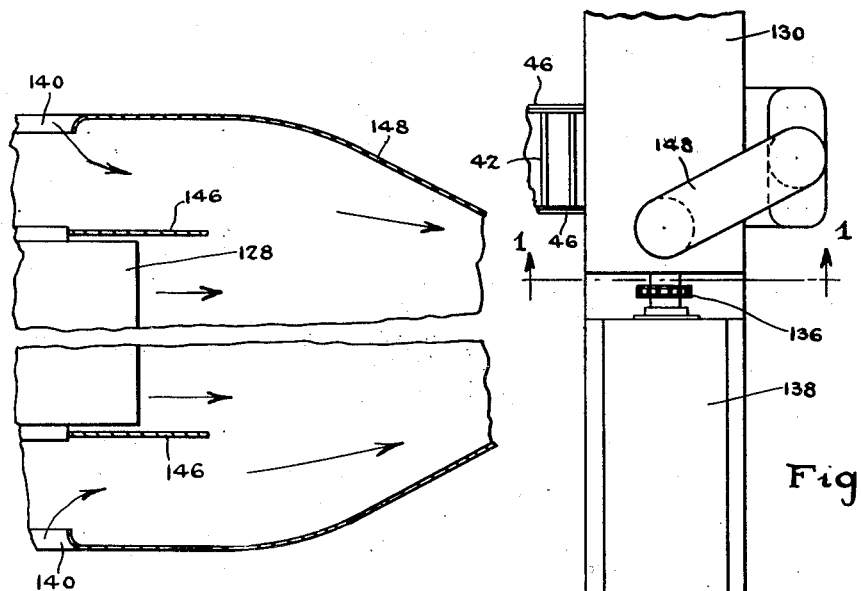
Fig-3
Fig-2
Inventor:
C. A. Grasswick.
By Whiteley and Ruckman
Attorneys.

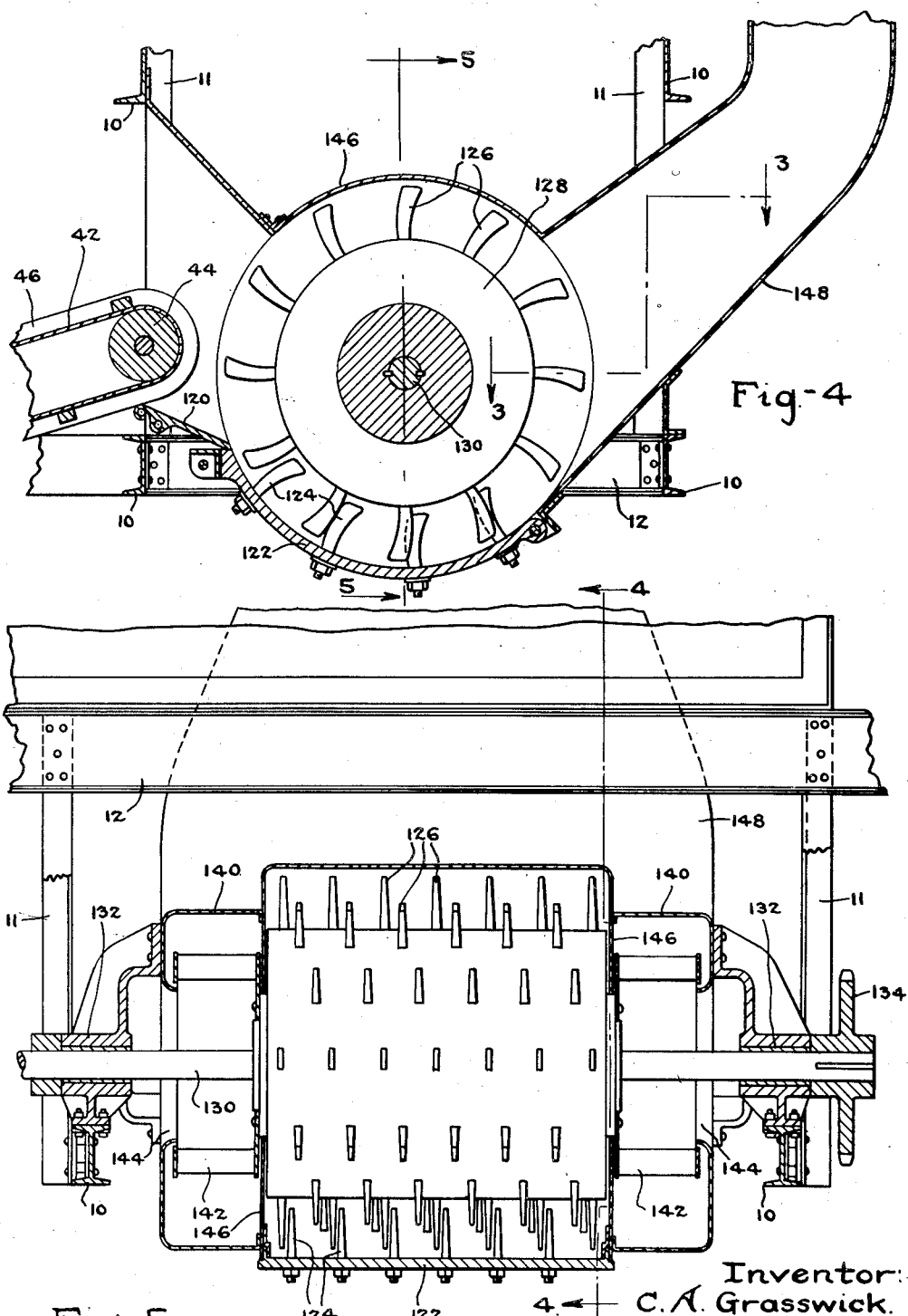

Patented Dec. 11, 1934

1,984,184

UNITED STATES PATENT OFFICE 1,984,184

COMBINE HARVESTER

Carl A. Grasswick, Valley City, N. Dak., assignor of one-third to Mina E. Eggen, Minneapolis, Minn.

Original application March 16, 1931, Serial No. 522,845, now Patent No. 1,897,661, dated February 14, 1933. Divided and this application February 13, 1933, Serial No. 656,554

3 Claims. (Cl. 130—27)

My invention relates to combine harvesters, and more particularly to threshing mechanism for threshing the grain which has been cut by a harvesting device such, for instance, as that disclosed and claimed in my co-pending application Serial Number 522,845, filed March 16, 1931 which matured into Patent Number 1,897,661, issued February 14, 1933. The present application is a division of said co-pending application. Among the objects of the invention disclosed in the present application are the provision of means for feeding the cut grain to a threshing cylinder and concave mounted on the main frame of the machine and the provision of blowing means such as fans housed at the two ends of the cylinder which suck the threshed material from the cylinder into the inlet opening of a tubular conveyor along which the material is then forced by the blast of air produced by the fans. In this connection, I have found that the provision of the fans results in a drying action on the grain, since the air delivered by the fans is considerably warmer than the outside air which is taken in by the fans.

The full objects and advantages of my invention will appear in connection with the detailed description thereof, and the novel features of my inventive idea will be particularly pointed out in the claims.

In the accompanying drawings, which illustrate an embodiment of my invention,—

Fig. 1 is a front elevational sectional view on the line 1—1 of Fig. 2. Fig. 2 is a top plan view. Fig. 3 is a view in section on the line 3—3 of Fig. 4. Fig. 4 is a view in section on the line 4—4 of Fig. 5. Fig. 5 is a view in section on the line 5—5 of Fig. 4.

Referring to the construction shown in the drawings, the numeral 10 designates longitudinal members, the numeral 11 designates vertical members and the numeral 12 designates transverse members of a main frame which is supported by a front wheel 14 and a pair of rear wheels 16. It will be understood that the machine may be pulled over the ground by hitching a tractor to the main frame. In order to cut the grain, a header platform may be secured to the side of the main frame in the manner shown in my prior application Serial Number 522,845, or in any other suitable manner. As shown in Fig. 4, the cut grain is carried from the header platform by an endless belt conveyor or apron 42 whose delivery end is trained around a roller 44 carried by side boards 46. These side boards rest upon the lower portion of a throat member 120 secured to the main frame of the machine. Extending from the lower portion of the throat 120 is a concave 122 provided with teeth 124 which cooperate with teeth 126 carried by a cylinder 128 secured to a shaft 130 mounted in bearings 132 carried by the frame. The front end of the shaft 130 carries a sprocket wheel 134 adapted to be driven from a sprocket wheel 136 secured to the shaft of a motor 138 mounted at the front of the frame and adapted to drive the operating parts of the machine in well-known manner. At the two ends of the cylinder 128 there are casing members 140 within which are fans 142 secured to the shaft 130 and which draw air in through openings 144. Leading from the casing members 140 and from the enclosure 146 which is around the cylinder, there is a tubular member 148 which extends upwardly, as shown in Fig. 4, and is then turned downwardly so as to enter a separator box 150 containing separator elements of well-known or any suitable construction, and which do not need to be described herein.

The operation and advantages of my invention will be obvious in connection with the foregoing description. The severed heads of grain are delivered through the throat 120 to the cylinder and concave so as to be subjected to the threshing action thereof. By referring to Fig. 3, it will be understood that the grain and straw are sucked from the cylinder and concave by the action of the two fans, and that when this material passes into the tubular member or conveyor 148 the blast of air carries it along for delivery to the separator box 150. By actual test it has been found that the air delivered by the fans 142 is considerably warmer than the entering air, and hence tends to dry the grain.

I claim:

1. In a machine of the class described, the combination of a frame, a threshing cylinder carried by said frame, a housing for said cylinder having a discharge opening in its rear wall, a separator, a tubular conveyor leading from said discharge opening to said separator, and blowing means at the ends of said cylinder which discharge into said tubular conveyor close to the rear of said discharge opening for sucking the threshed material from said cylinder directly into said conveyor and forcing it along the latter to said separator.

2. In a machine of the class described, the combination of a frame, a threshing cylinder carried by said frame, a housing for said cylinder having a discharge opening in its rear wall, a separator, a tubular conveyor leading from said discharge opening to said separator, and fans housed at the ends of said cylinder which discharge into said tubular conveyor close to the rear of said discharge opening for sucking the threshed material from said cylinder directly into said conveyor and forcing it along the latter to said separator.

3. In a machine of the class described, the combination of a frame, a threshing cylinder carried by said frame, a housing for said cylinder having a discharge opening in its rear wall, a separator, a tubular conveyor leading from said discharge opening to said separator, the shaft of said cylinder extending longitudinally of said frame, and fans secured to said shaft and housed at the ends of said cylinder, said fans discharging into said tubular conveyor close to the rear of said discharge opening for sucking the threshed material from said cylinder directly into said conveyor and forcing it along the latter to said separator.

CARL A. GRASSWICK.